April 25, 1939.  P. S. PITTENGER ET AL  2,155,444
HEXYLRESORCINOL CAPSULE
Filed May 10, 1935  2 Sheets-Sheet 2
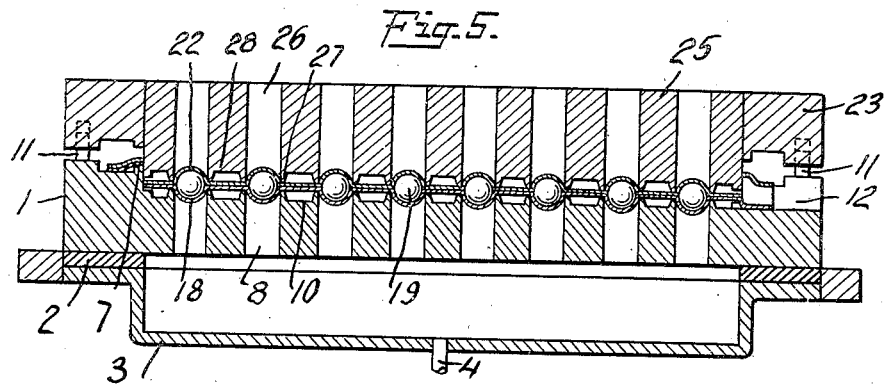
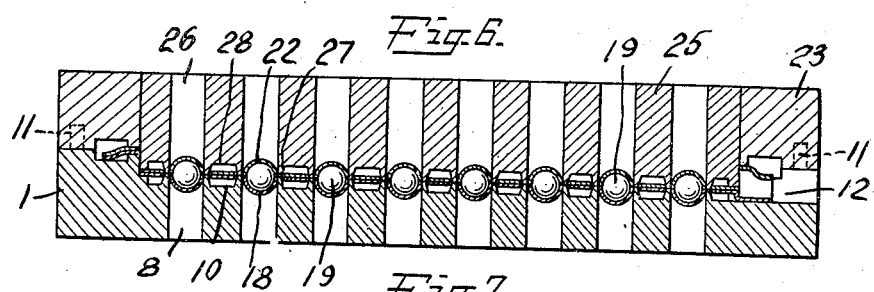
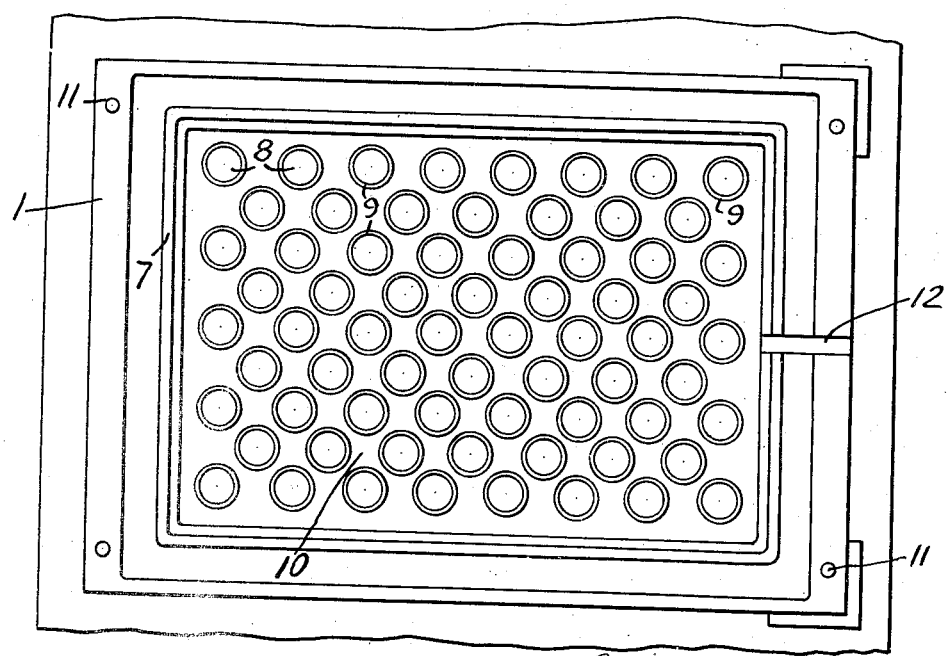
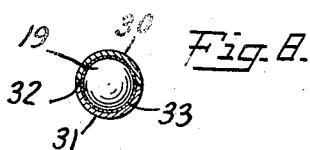
Paul S. Pittenger
John W. Jester INVENTORS
BY
Pennie, Davis, Marvin & Edmonds
ATTORNEYS Patented Apr. 25, 1939

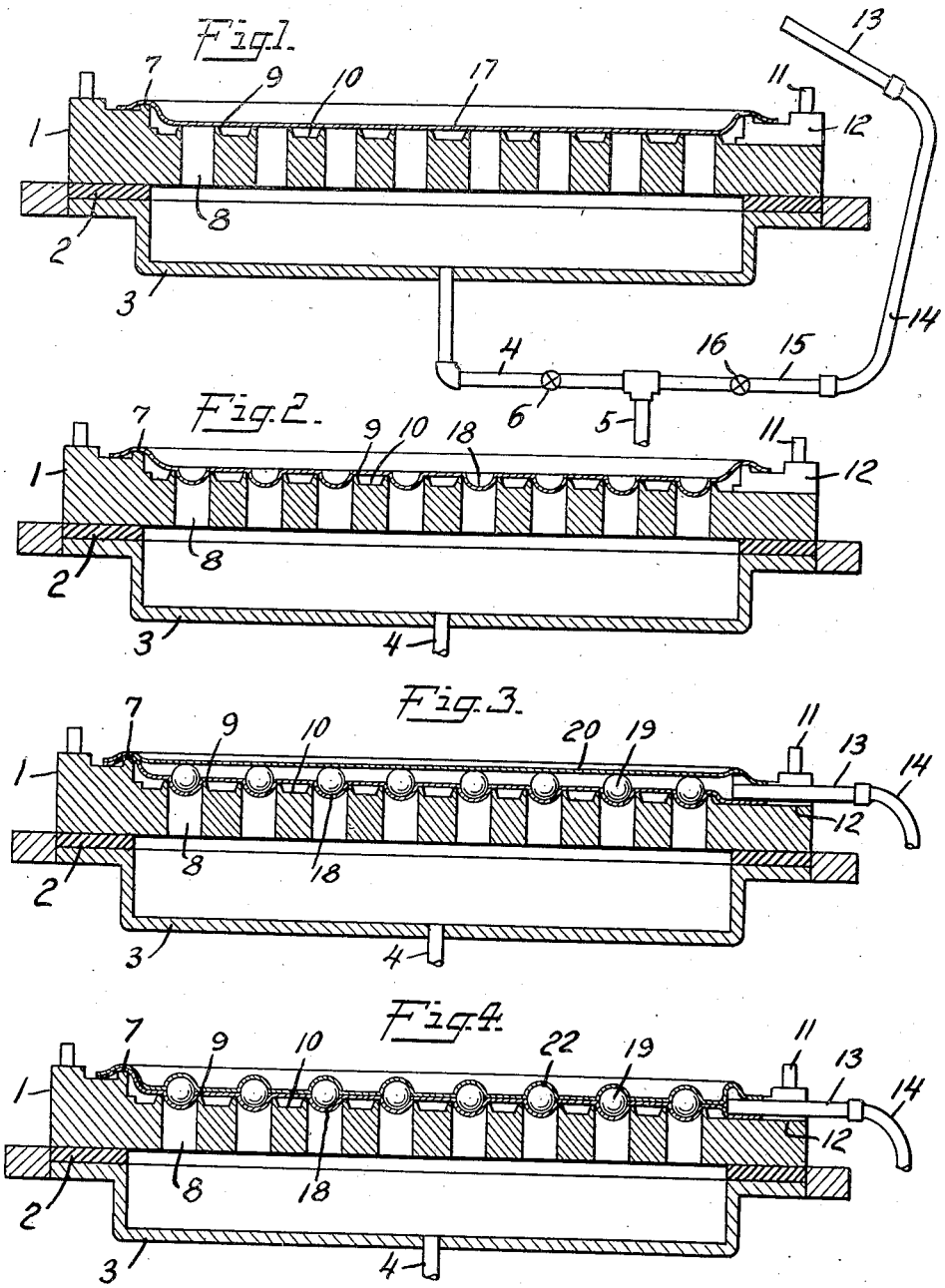

2,155,444

UNITED STATES PATENT OFFICE 2,155,444

HEXYLRESORCINOL CAPSULE

Paul S. Pittenger and John W. Jester, Philadelphia, Pa., assignors to Sharp & Dohme, Incorporated, Philadelphia, Pa., a corporation of Maryland Application May 10, 1935, Serial No. 20,859

3 Claims. (Cl. 167—83)

This invention relates to new hexylresorcinol capsules.

The new capsules contain solid hexylresorcinol in the form of a pill or tablet coated with a tough, tenacious, or soluble coating of soluble elastic sheet gelatin or similar material in which the hexylresorcinol is hermetically sealed.

The new capsules may advantageously be made by an improved process in which soluble elastic sheet gelatin has depressions or cavities preformed therein by the action of a vacuum, which cavities receive the solid hexylresorcinol pills or centers, and in which the preformed sheets of gelatin, with the pills contained in the depressions or cavities, are subjected to pressure between suitable dies to cut the gelatin sheets and hermetically seal the layers of gelatin together around the hexylresorcinol center.

Hexylresorcinol in solid or crystalline form has valuable properties as an anthelmintic but it is difficult to administer without injury to the mucous membranes of the mouth and throat. Pure hexylresorcinol crystals, because of their phenol-like properties, have a local coagulating effect on the mucous membranes of the mouth and throat, so that it is important that the hexylresorcinol crystals be kept from coming into direct contact with the mouth when administered. If hexylresorcinol is placed in the ordinary hard gelatin capsules it affects the gelatin in a deleterious manner with the result that after a certain time the gelatin of the capsules becomes full of pinholes. If the hexylresorcinol pill is coated with gelatin by the ordinary coating and dipping process, in which a solution of the gelatin is used for coating the pills, with drying of the moisture from the coating, the gelatin is similarly affected in a deleterious way by the hexylresorcinol. Attempts have been made to coat the hexylresorcinol pills with sugar but the sugar coating does not adhere satisfactorily, owing to the greasy nature of the hexylresorcinol, with the result that the coating tends to crack off of the pill with the slightest pressure between the teeth. A sugar coating also readily dissolves in the mouth and causes the hexylresorcinol to come into contact with the membranes of the mouth. A chocolate coating on the hexylresorcinol pills is similarly objectionable.

There is a natural tendency on the part of those taking the capsule, or several capsules, to hold them in the mouth and to chew them, particularly in the case of children, and with coatings which are soluble in the mouth and are removed, or with coatings which are easily broken or crushed between the teeth, there is danger of injury, as above pointed out; whereas in the case of hard gelatin capsules, and in the case of gelatin coatings made by the use of the ordinary coating pans or dipping machines, the coating is itself injuriously affected by the hexylresorcinol.

We have found that the objections above mentioned can be overcome and a satisfactory hexylresorcinol capsule produced by the use of tough, soluble sheet gelatin, and that by covering the hexylresorcinol pill or tablet with a comparatively thick sheet of such tough, soluble, plastic, elastic sheet gelatin and hermetically sealing the gelatin around the hexylresorcinol a satisfactory capsule can be produced with a tough, tenacious coating which is difficult to chew so that the capsules can be administered with a minimum of danger of injury to the mouth by releasing of the hexylresorcinol before it reaches the digestive tract. The objectionable burning effect which hexylresorcinol causes when it comes into direct contact with the mucous membranes of the mouth and throat is not shown when the capsules reach the stomach and the hexylresorcinol is released from the capsules and admixes with the contents of the stomach and passes therewith through the intestines, even though large amounts of hexylresorcinol are thus administered for anthelmintic purposes.

It has been customary, in the production of liquid-containing capsules, to use soluble sheet gelatin, to place a sheet of the gelatin in a female mold member having raised edges and having spaced openings therein, to pour the desired amount of liquid to be incapsulated on the sheet, then to place a second sheet of gelatin over this liquid in a manner which eliminates all air bubbles, and with the edge of the top sheet overlapping the raised edges of the lower sheet, and then to place a male mold member, having openings opposite those in the female member, on top of the top sheet, and place the mold members in a hydraulic press, where the pressure is applied. As the mold members are forced together, the liquid not being able to escape, pushes the elastic gelatin in both directions into the openings, thus forming the upper and lower halves of the capsule, and the action of the mold members finally cuts the gelatin and forces the edges together, thus hermetically sealing the capsules.

This method of forming gelatin coated capsules, while satisfactory for the incapsulation of liquids, cannot be applied to the coating of solid pills or tablets.

We have found, however, that if the sheet gelatin is subjected to a preforming treatment by the application of a vacuum in a suitable mold having openings therein, depressions or recesses can be made in the sheet, in which the pills or tablets can be placed, and by suitable preforming depressions in the top sheet of gelatin, these pills or tablets can be enclosed, and the sheets can then be forced together and hermetically sealed by the application of pressure to give a continuous tough, elastic gelatin coating which resists the action of the teeth and which protects the hexylresorcinol when the capsule is administered. The preforming of the depression or recesses in the gelatin sheets, by the application of vacuum, is important, since it insures a practically uniform thickness of the gelatin coating without tearing of the gelatin sheet and without variations in thickness of the coating at different parts such as would be caused by the action of the mold members if the depressions or recesses had not been preformed in the sheets before the pressing and cutting operation was applied.

The hexylresorcinol pills or centers which are coated with sheet gelatin, in making the new capsules, may be made in any suitable way, for example, in the form of pulverous pills of suitable size, e. g., containing 0.2 gr. These pills or centers may themselves contain some moisture, and the soluble elastic gelatin may also contain some moisture as well as glycerin. In order to protect the hexylresorcinol and the gelatin coating from coming into contact with each other, and to prevent or minimize any action of the hexylresorcinol upon the gelatin coating, the hexylresorcinol pills are advantageously coated with a thin layer of an inert material, such as starch, which will form an insulating layer between the hexylresorcinol and the gelatin coating.

In making the new capsules it is possible to use molds such as have heretofore been commonly used for making liquid-containing capsules of sheet gelatin, but these molds are modified to permit the application of a vacuum to draw the sheet gelatin down into the openings in the lower or female mold member, thereby forming depressions or recesses in which the hexylresorcinol pills can be placed; and provision is also made for applying a vacuum to the upper sheet of gelatin to form corresponding recesses or depressions in it, corresponding to the openings in the upper or male mold member, so that, when the upper or male member is placed on top of the lower mold member, the depressions in both sheets of gelatin will have been preformed, and the mold members can then be placed in a hydraulic press and the two sheets forced together to cut the capsules from the sheets and to cause the edges of the two sheets to come together to form a seal, thus giving hermetically sealed capsules.

The invention will be further described in connection with the accompanying drawings, which illustrate, more or less diagrammatically, an apparatus adapted for producing the new capsule product of the invention.

In the accompanying drawings,

Fig. 1 is a transverse vertical section of part of the apparatus showing the lower mold member and part of the vacuum producing equipment;

Fig. 2 is a similar view showing the gelatin sheet with depressions formed in it by means of the vacuum;

Fig. 3 is a similar view showing the pills inserted in the depressions and covered with another gelatin sheet;

Fig. 4 is a similar view showing the preforming of depressions in the upper gelatin sheet by the application of a vacuum;

Fig. 5 is a similar view with the upper mold member applied;

Fig. 6 is a view showing the mold members and capsules after pressure has been applied;

Fig. 7 is a plan view of the apparatus of Fig. 1; and

Fig. 8 shows the finished capsule.

The lower or female mold member 1 is shown as supported by the rubber gasket 2 above a vacuum chamber 3 having pipe connections 4 and 5 leading to a vacuum producing means (not shown), and valve 6 for connecting or disconnecting the vacuum chamber with the vacuum producing means.

The mold member 1 has a raised edge portion 7 and a series of openings 8 having a diameter and/or shape corresponding to that of the capsule to be produced, these openings being surrounded by raised cutting edge portions 9, between which are depressed portions 10. The mold member has guide lugs 11 for centering the upper mold member, or mold member frame, when applied.

On one side the mold member 1 has a groove 12 adapted to receive a pipe 13 connected through the flexible pipe connection 14 and the pipe 15 with the vacuum producing means. A valve 16 is provided for connecting and disconnecting this pipe with the vacuum producing means.

The gelatin sheet 17 is shown in Fig. 1 as it is first applied to the lower mold member, and in Figs. 2, 3 and 4 as having depressions or recesses 18 formed by the application of a vacuum to the lower side of the gelatin sheet. The pills 19 are shown in Figs. 3 and 4 as located in the depressions 18. The top sheet 20 of gelatin is shown in Fig. 3 as first applied, and in Fig. 4 as it exists after the vacuum has been applied between the two sheets, and with preformed recesses 22 similar to the recesses 18 of the lower gelatin sheet.

The upper mold member 25 is shown in Figs. 5 and 6, this mold member being enclosed in a frame 23 having openings or recesses aligning with the lugs 11 of the lower mold member. The upper mold member has openings 26, cutting edges 27 and depressions 28 corresponding to the similar elements of the lower mold member.

The finished capsules 29 are shown in Figs. 6 and 8, these capsules having the central solid pill 19 surrounded with a thin layer of inert material such as starch, indicated at 33, and with a continuous gelatin coating made up of the upper and lower portions 30 and 31 of generally semispherical form integrally united at 32 to form an hermetically sealed layer of sheet gelatin around the solid pill center. Fig. 8 is an enlarged sectional view of the capsule.

In forming the new gelatin coated capsule, a sheet of soluble elastic gelatin is placed on the lower mold member, as shown in Fig. 1, and a vacuum is applied through the vacuum chamber and vacuum producing means to cause the gelatin to be drawn into the openings 8, thus preforming the depressions 18 in the gelatin sheet as shown in Fig. 2. The pills to be coated are then placed in the depressions thus formed, as shown in Fig. 3. The pipe 13 is then inserted in the groove 12 above the lower gelatin sheet, and the upper gelatin sheet 20 is then laid over the pills as shown in Fig. 3. As thus applied, the sheet contacts only with the pills at their highest points, and the edges of the upper sheet extend over the edges of the lower sheet and form a tight seal, with the pipe 13 extending between the edges of the two sheets.

A vacuum is now applied through the pipe 13 and the air between the two sheets is withdrawn and the upper sheet is forced down around the pills and against the lower sheet, thus preforming recesses or depressions 22 in the upper sheet corresponding to the recesses or depressions 18 in the lower sheet. The action of atmospheric pressure above the top sheet, together with the application of a vacuum between the two sheets, while maintaining a vacuum below the lower sheet, results in uniformly stretching the gelatin of the upper sheet around the upper portions of the pills. A somewhat higher degree of vacuum can be applied between the sheet than that maintained below the lower sheet, so that the depressions or recesses in the upper and lower sheets will be of approximately the same depth, and so that approximately half of each pill will be covered by each of the gelatin sheets.

Before releasing the vacuum the upper or male mold member and its surrounding frame are placed upon the upper sheet, as shown in Fig. 5. The vacuum is then released, the pipe 13 removed, and the upper and lower mold members are then placed in a hydraulic press (not shown) or other suitable press or means of applying a high pressure to force the upper and lower mold members together and cut the two sheets of gelatin and to force the edges of the cut sheets together to form a seal and complete the capsule, as shown in Figs. 6 and 8.

The pills 19 may be made in an ordinary pill or tablet machine, and these may have only sufficient strength to withstand handling and such pressure as is applied during the applying of the gelatin sheets thereto. These pills may, as previously stated, advantageously be coated with a layer of inert material, such as starch, before the gelatin coating is applied. The finished capsules, shown in Fig. 8, have the central pill 19 with the layer of starch or other inert material 33 surrounding them, and with the outer gelatin coating which is made up of the upper and lower parts 30 and 31, of generally semi-spherical shape, united at 32 where the cut edges of the gelatin sheets are forced together under the high pressure and effectively sealed to give, in effect, a continuous gelatin coating which is, however, made up of two parts of sheet gelatin integrally united together.

The result of the preforming of the depressions or recesses in the upper and lower gelatin sheets is to stretch the gelatin more or less uniformly so that the coating as a whole is of approximately uniform thickness. Because gelatin is elastic, it is important to hold the vacuum on the sheet after the depressions are preformed therein, and until the mold members are brought together, and the application of a vacuum between the sheets has the added advantage of removing air so that, when the capsules are sealed, they are free or substantially so from air. The pills are thus retained in an evacuated and substantially air-free state hermetically sealed in the outer gelatin coating.

The preforming of the recesses or depressions in both the lower and upper sheets of gelatin enables the two halves of the mold to be pressed together without stretching and tearing the gelatin, as the mold, used in this way, simply serves to press the cutting faces together, thus hermetically sealing and dieing out the coated pills.

The new hexylresorcinol capsules, produced as above described, contain the solid crystalline hexylresorcinol protected by the layer of starch from direct contact with the gelatin coating, and they have a tough soluble plastic elastic gelatin coating hermetically sealing them, which coating, because it is tough, elastic and tenacious, is difficult to chew, and is not readily removed to permit the hexylresorcinol to escape and come into contact with the mouth when the capsules are administered.

The new hexylresorcinol capsules have been subjected to extensive clinical tests, and the results have proven these capsules to be highly satisfactory for oral administration for anthelmintic purposes. Crystalline hexylresorcinol, properly administered, is remarkably effective in the treatment of Ascaris, hook worms and pin worms, and the new capsules of the present invention are particularly advantageous for oral administration for that purpose. The tough elastic nature of the sheet gelatin coating reduces to a minimum the danger of breaking or cracking of the coating by chewing, particularly when administered to children, while the nature and method of application of the coating protects the hexylresorcinol both prior to and during the time of administration but nevertheless enables it to be readily made effective when the capsules are swallowed and the soluble gelatin coating is removed.

While we have described the use of soluble elastic sheet gelatin for forming the coating around the capsules, other suitable tough, elastic, soluble material can be used provided it has a sufficient degree of toughness, elasticity, etc., to permit it to be preformed and sealed in a similar way, and a sufficient degree of solubility to enable it to serve as a soluble coating which will release the hexylresorcinol after swallowing of the capsules, but protect the hexylresorcinol prior to and during administration.

We claim:

1. Hexyl resorcinol capsules having the center of solid hexyl resorcinol coated with a thin layer of inert material such as starch and hermetically sealed in a continuous, tough, tenacious adhering layer of soluble elastic material of practically uniform thickness throughout, said layer of material being made up of two parts with the edges integrally united together.

2. Hexyl resorcinol capsules having a center of solid hexyl resorcinol coated with a thin layer of inert material such as starch and hermetically sealed in a continuous, tough, tenacious layer of soluble elastic gelatin of practically uniform thickness throughout, said layer of gelatin being made up of two parts with the edges integrally united together, and the hexyl resorcinol being contained in said capsules in an evacuated and substantially air-free state.

3. Hexyl resorcinol capsules having a center of solid hexyl resorcinol having a thin coating of starch or other inert material surrounded by a continuous, tough, tenacious layer of soluble elastic gelatin of practically uniform thickness throughout, said layer of gelatin being made up of two parts with edges integrally united together and forming an hermetically sealed capsule.

PAUL S. PITTENGER.
JOHN W. JESTER.